United States Patent [19]

Moriya

[11] Patent Number: 4,876,677

[45] Date of Patent: Oct. 24, 1989

[54] SENSOR MOUNT FOR AN ELECTRONIC TIMEPIECE

[75] Inventor: Tatsuo Moriya, Suwa, Japan

[73] Assignee: Seiko Epson Corporation, Tokyo, Japan

[21] Appl. No.: 164,352

[22] Filed: Mar. 4, 1988

[30] Foreign Application Priority Data

| | | | |
|---|---|---|---|
| Mar. 5, 1987 | [JP] | Japan | 62-32208[U] |
| Mar. 5, 1987 | [JP] | Japan | 62-32209 |
| Mar. 6, 1987 | [JP] | Japan | 62-32785[U] |

[51] Int. Cl.[4] ........................ G01C 19/00; G04B 37/00

[52] U.S. Cl. ........................................ 368/87; 368/88; 368/318

[58] Field of Search .................... 368/87, 88, 203–204, 368/276, 318

[56] References Cited

U.S. PATENT DOCUMENTS

| | | | |
|---|---|---|---|
| 3,800,523 | 4/1974 | Yamazaki | 368/202 |
| 4,042,861 | 8/1977 | Yasuda et al. | 368/88 |
| 4,164,843 | 8/1979 | Fujimori | 368/88 |
| 4,241,439 | 12/1980 | Skuarek | 368/204 |
| 4,243,329 | 7/1981 | Nakayama | 368/88 |
| 4,272,838 | 6/1981 | Kasawa et al. | 368/88 |
| 4,435,088 | 3/1984 | Dorfman | 368/204 |
| 4,788,669 | 11/1988 | Kamiyama | 368/80 |

FOREIGN PATENT DOCUMENTS

| | | |
|---|---|---|
| 2082397 | 3/1982 | United Kingdom . |
| 2095039 | 9/1982 | United Kingdom . |
| 2098398 | 11/1982 | United Kingdom . |
| 2174537 | 11/1986 | United Kingdom . |

*Primary Examiner*—Vit W. Miska
*Attorney, Agent, or Firm*—Blum Kaplan

[57] ABSTRACT

A circuit substrate mounting configuration for mounting an IC chip having a built in semiconductor sensor in an electronic timepiece is provided. The circuit substrate is fixed to a base plate at at least two points spaced as far as possible from the IC chip so that the substrate about the IC chip does not contact other elements of the timepiece.

11 Claims, 5 Drawing Sheets

SENSOR MOUNT FOR AN ELECTRONIC TIMEPIECE

BACKGROUND OF THE INVENTION

This invention relates to electronic timepieces, and more particularly to electronic timepieces having a semiconductor sensor to measure temperature and pressure.

An example of such an analog quartz electronic timepiece is Japanese Patent Publication No. 61-52955, wherein the integrated circuit chip of the sensor is mounted on a substrate which is applied directly on the base frame. The substrate is affixed to the frame by a circuit securing plate anchored to the base by screws. This results in securing most of the circuit substrate.

The construction utilized in the prior art electronic timepieces has been satisfactory, however it suffers from the disadvantage that the supporting substrate invariably bends to some degree. This is due to changes in the height of the plate, and thickness of the circuit substrate and supporting plate, substrate warpage and changes in screw pressure. When the substrate bends, the IC chip also bends slightly due to being bonded to the circuit substrate. When a semiconductor sensor is built into the IC chip, any bending of the IC chip causes changes in channel length and/or the channel width of the transistor forming the sensor. This causes changes in the properties of the sensor even when the degree of bending is minute.

When the clamping force of the screw securing the circuit substrate to the supporting plate changes due to variations in temperature, vibrations or the like, the bending of the circuit substrate around the IC chip produces large changes in sensor properties. This occurs even if an offset adjustment or inclination adjustment for the sensor is made. As a result of such bending, the properties of the sensor vary from the initial condition set by the manufacturer. Such a change in properties greatly affects the accuracy of the timepiece over time.

Accordingly, it is desirable to provide a mount for a semiconductor sensor in an electronic timepiece to overcome the shortcomings of the prior art described above.

SUMMARY OF THE INVENTION

Generally speaking, in accordance with the invention, a circuit substrate supporting a semiconductor sensor is affixed to the frame of an electronic timepiece so that the sensor is not in contact with other components of the timepiece. The circuit substrate is affixed to the frame at at least two positions substantially distant from the sensor. Check terminals for measuring the characteristics of the electronic timepiece circuit are formed on the circuit substrate. The check terminals are selectively detachably secured across gaps in the circuit substrate so that the check terminal, not the substrate itself, is deflected when the check terminal is contacted by a pin probe.

Accordingly, it is an object of this invention to provide an improved electronic timepiece.

Another object of the invention is to provide an electronic timepiece in which the integrated circuit containing the semiconductor sensor is not affected by bends in the circuit substrate.

A further object of the present invention is to provide an electronic timepiece of high reliability in which the properties of the semiconductor sensor remain substantially constant when the securing conditions around the circuit substrate change.

Yet another object of the invention is to provide an electronic timepiece in which the circuit substrate does not bend when contacted by a pin probe.

Still other objects and advantages of the invention will in part be obvious and will in part be apparent from the specification and drawings.

The invention accordingly comprises the features of construction, combination of elements, and arrangement of parts which will be exemplified in the construction hereinafter set forth and the several steps and relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
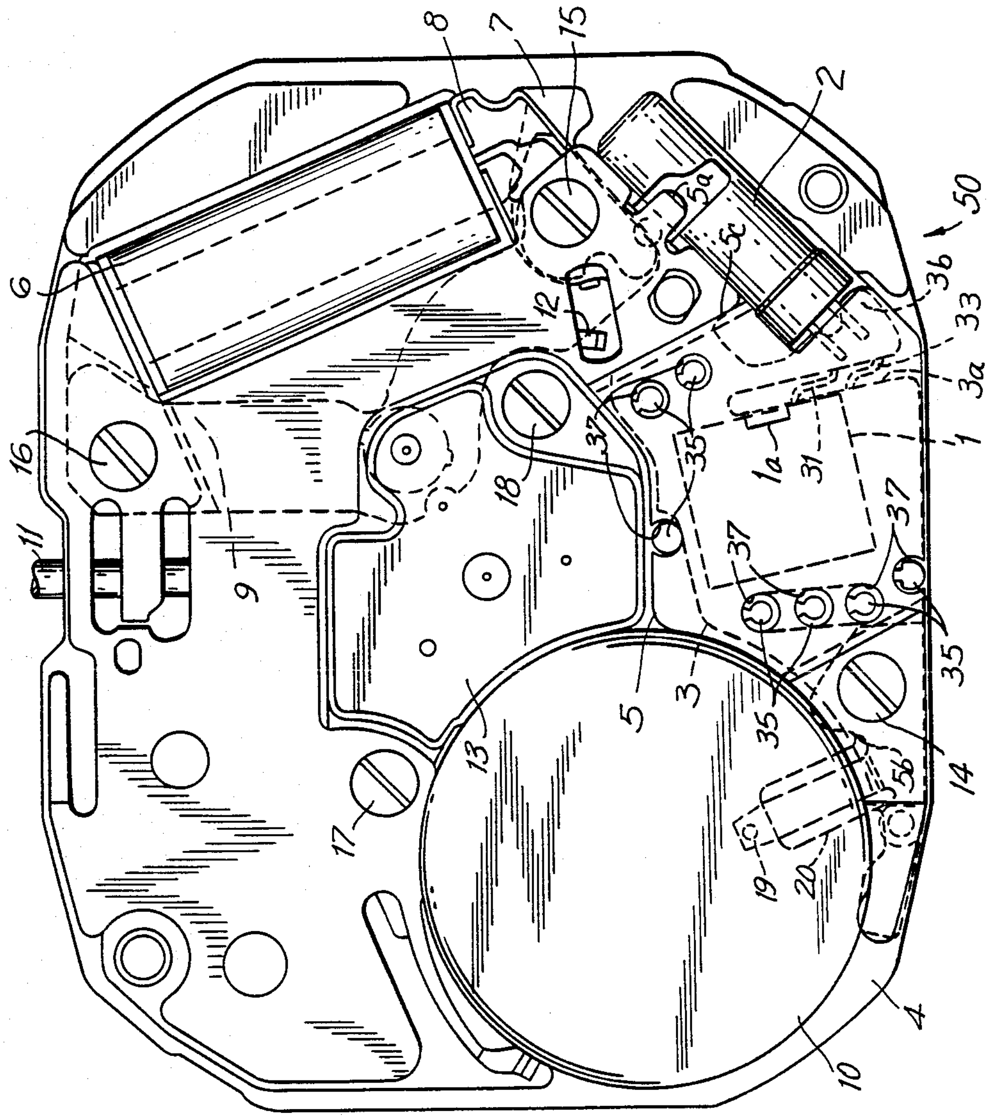
FIG. 1 is a plan view of the components of an electronic timepiece constructed in accordance with the invention.
Figure 2:
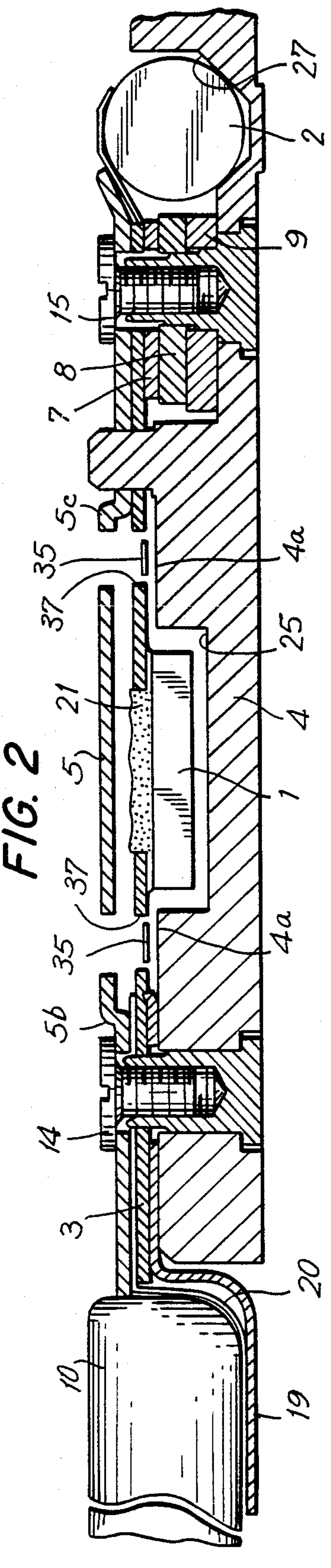
FIG. 2 is a sectional view of the circuit portion of the electronic timepiece of FIG. 1.
Figure 3:
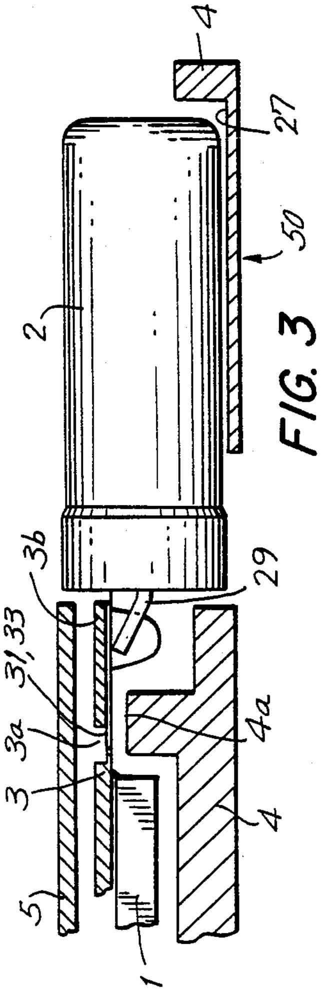
FIG. 3 is a sectional view of a portion of the circuit substrate showing electrical coupling to the quartz crystal oscillator.

Reference is made to FIGS. 1–3 wherein an electronic timepiece generally indicated as 50, constructed in accordance with a preferred embodiment of the invention is shown. A plate 4 formed of a molded synthetic resin forms a base frame for timepiece 50. Plate 4 is formed with projected regions **4*a* forming a gap 25 therebetween. A flexible circuit substrate 3 is supported across plate 4 at each of projecting regions 4*a* so as to extend across gap 25. An integrated circuit (CMOS-IC) chip 1 for use in analog electronic timepiece 50 having a temperature compensating function is mounted on substrate 3 in facing relationship with plate 4 and extends into gap 25. A mold 21 is formed on substrate 3 to securely affix chip 1 to substrate 3. A semiconductor temperature sensor 1*a* is included in IC chip 1**.

A quartz crystal oscillator 2 is supported within a notch 27 formed in plate 4 and is conductively coupled to substrate 3 by lead 29 soldered to substrate 3 at a portion 3*b*. A circuit supporting plate 5 is secured to plate 4 by screws 14, 15, 16 and 17 and secures quartz oscillator 2 and circuit substrate 3 to plate 4.

Quartz oscillator 2 has a frequency temperature characteristic which is adjusted in response to changes in temperature sensed by a semiconductor sensor 1*a*. The frequency temperature characteristic of a quartz oscillator becomes inclined or convex upwardly or downwardly when the performance of the semiconductor sensor changes. When this occurs, an extremely accurate oscillation, within an annual error of 10 to 20 seconds, is not possible. For this reason any change in the characteristics of sensor 1*a* must be reduced as far as possible.

In the exemplary embodiment, chip 1 is a CMOS-IC chip and quartz oscillator 2 oscillates at about 32,768 Hz. IC chip 1 is bonded to substrate 3 while quartz oscillator 2 is connected to substrate 3 by soldering. Plate 4 is formed with dowels for adjusting the position of each part and metalic screw pins and notches are used for adjusting the position of each part for securing and releasing the components to displace dowels.

Electronic timepiece 50 is powered by a silver oxide cell 10 conductively coupled to circuit substrate 3 by a lead 20 positioned at negative terminal 19 of cell 10. A magnetic core 7 of a coil 6 is coupled to circuit substrate 3 by a coil lead substrate 8. A stator 9 cooperates with coil 6 and is coupled to a gear train (not shown) supported in gear train support 13 for moving the hands of the analog display (not shown) of timepiece 50. Coil 6 and stator 9 are supported between plate 4 and circuit supporting plate 5. A gear train support 13 is secured to plate 4 by screw 18. The analog display is adjusted by a winding stem 11 and lever 12 adjusts the seconds.

Circuit substrate 3 is affixed to frame 4 solely by screw 14 and screw 15 each of which is separated a relatively large distance from IC chip 1. Circuit supporting plate 5 is formed with bent regions 5*b*, 5*c* on opposed sides of chip 1 so that securing plate 5 extends in a position elevated above IC chip 1. Furthermore, the depth of gap 25 is greater than the height of chip 1 extending from circuit substrate 3. Accordingly, IC chip 1 freely hangs within gap 25 and does not contact any of the other components of timepiece 50. By using such a support configuration, even if screws 14 or 15 are loosened due to a change in temperature or vibration and the height of fixed circuit substrate 3 changes, the amount of bending in the immediate vicinity of IC chip 1 is minimal. This is due to the relatively long distance between the mounting portion of circuit substrate 3 and the mounting position of IC chip 1. Additionally, since circuit substrate 3 is flexible except for the region around IC chip 1 due to mold 21 which absorbs much of the mounting deviations, bending of circuit substrate 3 in the vicinity of IC chip 1 is reduced even further. As a result, the bending of IC chip 1 is also greatly reduced which avoids a change in shape of the transistor forming the semiconductor sensor, and the resulting change in sensor characteristics.

Figure 4:
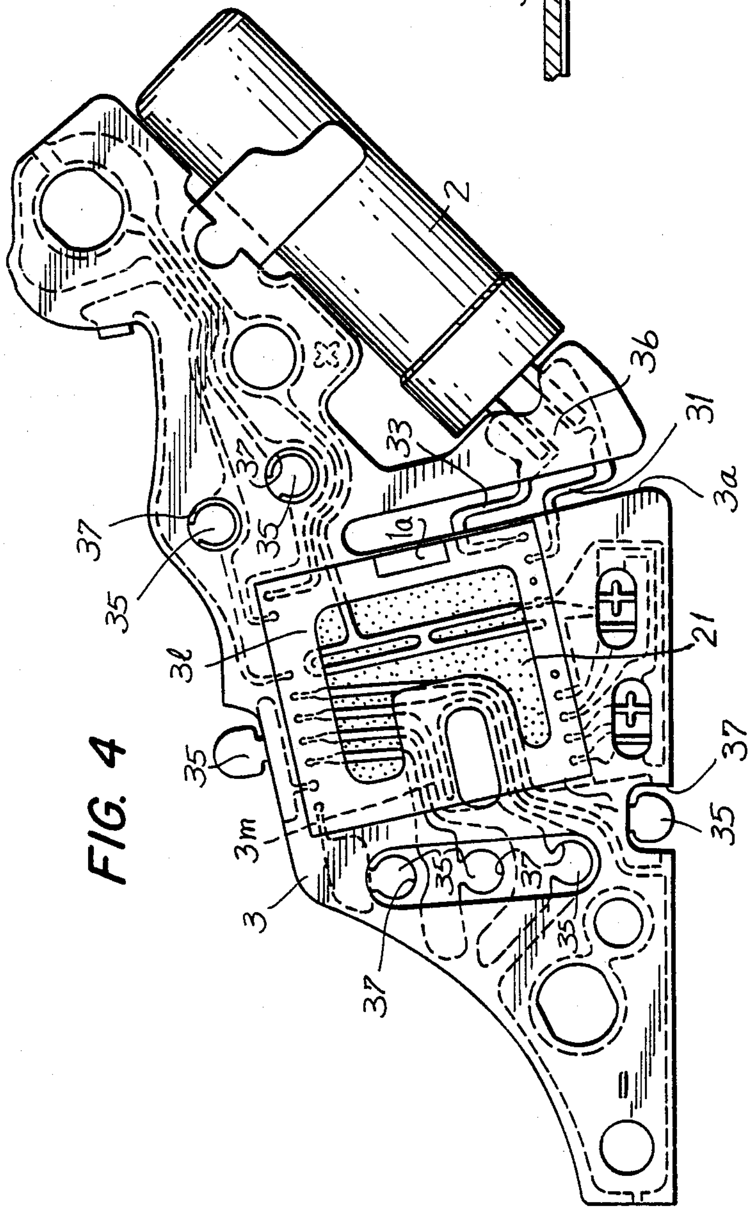
FIG. 4 is a plan view of the circuit substrate of the electronic timepiece of FIGS. 1 and 2.

Referring to FIG. 4, circuit substrate 3 may be formed with an additional slit 3*a* along a side of IC chip 1 between the mounting portion of IC chip 1 and oscillator 2. Slit 3*a* separates IC chip 1 from oscillator 2 thereby nullifying the influencing displacements produced by oscillator 2 at mounting portion 3*b* due to changes in the condition of quartz oscillator 2. Lead patterns 31, 33 extend along circuit substrate 3 parallel to slit 3*a* to lengthen the distance between leads 29 of oscillator 2 and IC chip 1 which further minimize the influence of oscillator 2 on IC chip 1.

Figure 5:
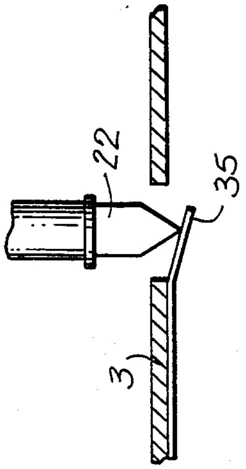
FIG. 5 is a sectional view of a portion of the substrate showing a pin probe in contact with a check terminal in accordance with the invention.
Figure 6:
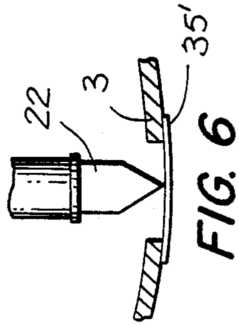
FIG. 6 PRIOR ART
FIG. 6 is a sectional view of a portion of the substrate showing a pin probe in contact with a check terminal in accordance with the prior art.

Circuit substrate 3 contains a plurality of holes 37. Check terminals 35 for measuring the temperature characteristics of quartz oscillator 2, temperature sensor 1*a* or inputting data for the offset adjustment are formed as cantilevered or overhang patterns 35 within holes 37. Terminals 35 are flexible and fixed at only one end so they may be selectively depressed within holes 37 as shown in FIG. 5. Accordingly, when a pin probe 22 contacts a check terminal 35 to adjust the offset, only check terminal 35 becomes displaced preventing the unnecessary bending of substrate 3. However, as in the prior art terminals, when a check terminal 35' is not displaceable relative to circuit substrate 3, circuit substrate 3 bends when pin probe 22 comes in contact with check terminal 35' (FIG. 6). Accordingly, sensor 1*a* bends changing the characteristics of sensor 1*a*.

Figure 7:
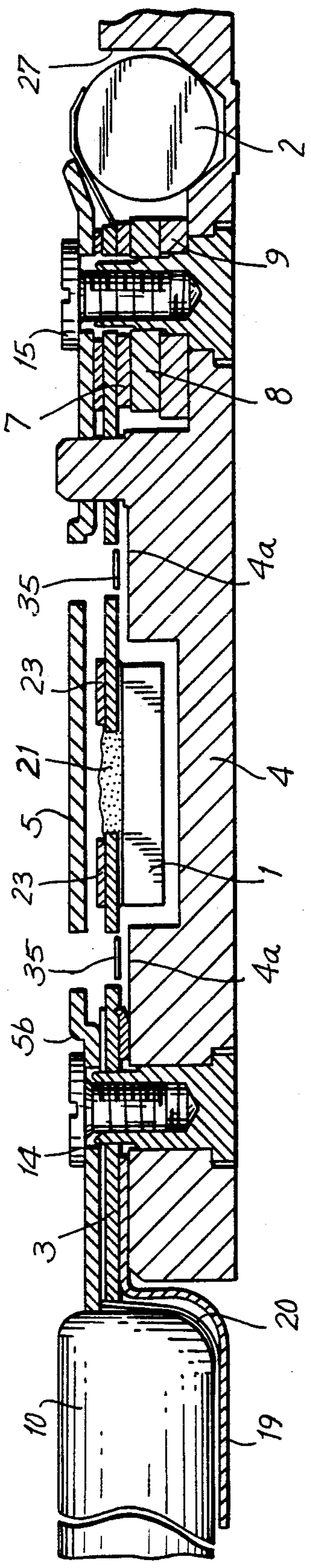
FIG. 7 is a sectional view of the circuit portion of an electronic timepiece in accordance with another embodiment of the inventor.
Figure 8:
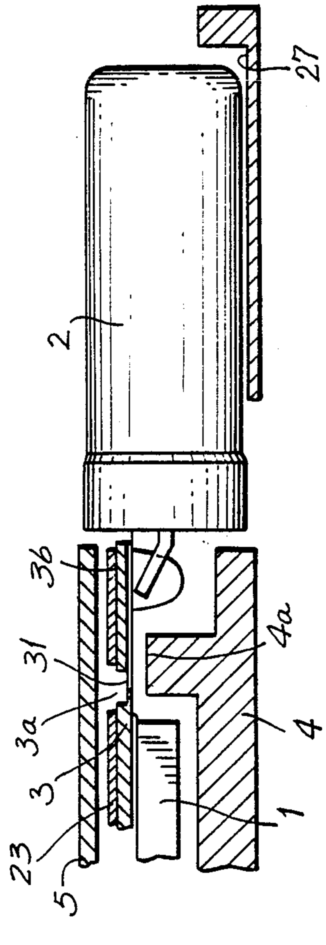
FIG. 8 is a sectional view of a portion of the circuit substrate showing electrical coupling to the quartz crystal oscillator of the timepiece of FIG. 7.
Figure 9:
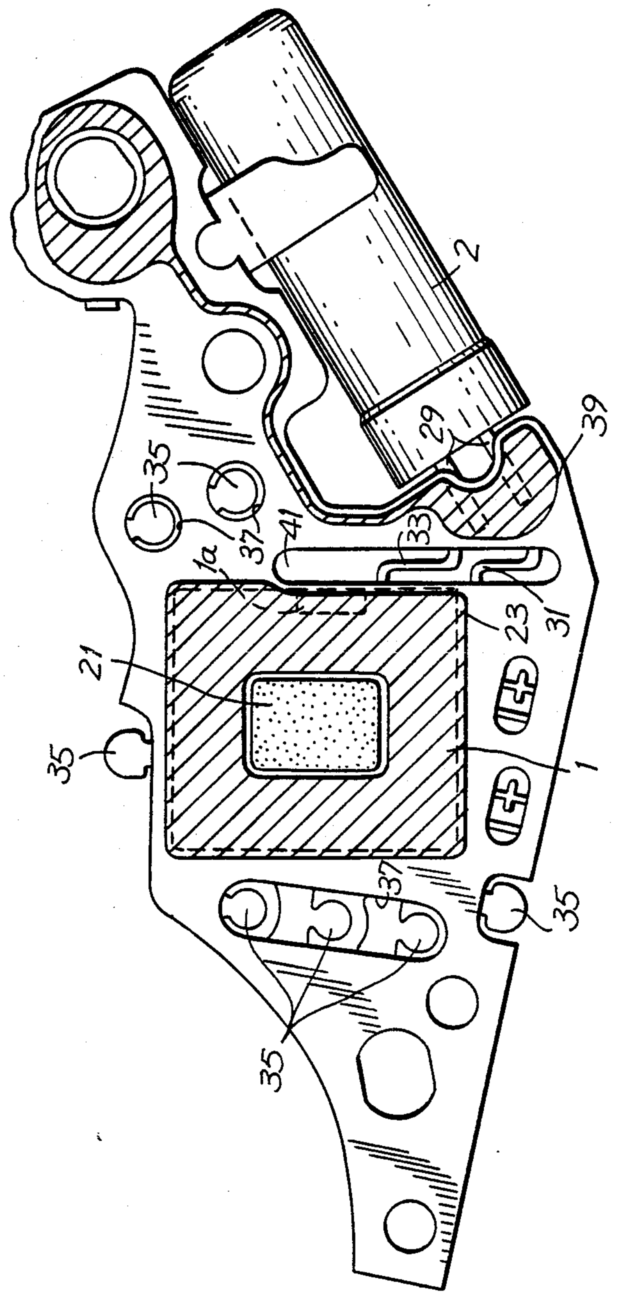
FIG. 9 is a plan view of the circuit substrate illustrated in FIGS. 7 and 8.

The bending of IC chip 1 and in turn the changing of characteristics of sensor 1*a* can be minimized substantially by selectively reinforcing circuit substrate 3 around the IC chip mounting portion. FIGS. 7–9 illustrate a second embodiment of electronic timepiece 50, formed in accordance with the invention in which the flexible circuit substrate 3 is reinforced. Like numbers are utilized to identify elements identical to those contained in the embodiment discussed above.

A foil 23 is placed about IC chip 1 to form a relatively rigid frame thereabout. Foil 23 may be formed of a 70$\mu$m thick copper foil placed about IC chip 1 through etching so that only a relatively thin rigid frame remains about the mounting position of IC chip 1. By providing copper foil 23 about the IC chip 1, the rigidity of circuit substrate 3 about the mounting position of IC chip 1 is increased relative to the remainder of circuit substrate 3. A hole 41 is provided adjacent to an edge of IC chip 1 to separate oscillator 2 from IC chip 1. Additional foil 39 is placed on circuit substrate 3 at the soldering point of quartz oscillator 2 and contacts circuit supporting plate 5. Foil 39 may also be formed of a copper foil and surrounds screw 15 to form a plus potential to prevent changes in capacity of the quartz oscillator circuit.

By mounting an IC chip containing a sensor in the timepiece on a flexible circuit substrate so that the circuit substrate is secured to the timepiece only at positions relatively far from the mounting portion of the IC chip so that the IC chip does not come in contact with other timepiece parts, many advantages over the prior art are presented. Changes in the characteristics of the IC chip and semiconductor sensor are avoided even when the distance between the circuit substrate and plate 4 change due to variations in enviroment, temperature, and vibration. Bending of the IC chip becomes minimalized to a level tolerable to prevent changes of the semiconductor sensor characteristics. Because the circuit substrate can undergo certain stresses without affecting the characteristic of the semiconductor sensor, a single circuit substrate having known characteristics may be mass produced and easily assembled in electronic timepieces, without the necessity for readjustment. This results in cost and time reductions during assembly. Furthermore, measuring and adjusting of such a simplified apparatus may be automatized.

By using a single substrate having known characteristics, after sale servicing of the timepiece can be conducted by simply exchanging an old circuit substrate with a new circuit substrate. Thus, a reduction in repair cost and time is realized. Furthermore, by providing check terminals detachably mounted within holes formed in the circuit substrate the check terminals may be selectively depressed by a pin probe and additional unnecessary bending of the circuit substrate is avoided. This prevents inadvertent changing of semiconductor sensor properties during testing.

It is intended that the embodiment wherein the electronic timepiece is an analog timepiece having a quartz crystal oscillator being compensated by a semiconductor temperature sensor in an IC chip is merely illustrative. The present invention may also be applied to compact electronic apparatus having a semiconductor sensor such as desktop calculators, electronic thermometers or the like.

It will thus be seen that the objects set forth above, among those made more apparent from the preceding description, are efficiently obtained and since certain changes may be made in the above construction and process without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In an electronic timepiece including a base plate, an IC chip having a built-in semiconductor sensor for measuring the surrounding state, a circuit substrate having the IC chip mounted thereon, the improvement which comprises:

fixing means for fixing the circuit substrate to the base plate at at least two fixing positions spaced sufficiently far from the mounting position of the IC chip so that the circuit substrate in the region around the IC chip does contact any other element of the time timepiece, the fixing means including a circuit supporting plate for securing the circuit substate to the base plate only at the fixing positions.

2. The electronic timepiece of claim 1, wherein the circuit substrate further includes at least one check terminal formed in a pattern of an overhanging cantilever whereby the substrate is not displaced when the check terminal is operated.

3. The electronic timepiece of claim 1, further including an electronic element and wherein the circuit substrate is formed with at least one elongated slit in the region of the mounting portion of the IC chip between the IC chip and the electronic element for reducing displacement of the circuit substrate in the region of the IC chip.

4. The electronic timepiece of claim 3, further including wiring overhanging the elongated slit in the circuit substrate disposed parallel to the length of the slit.

5. The electronic timepiece of claim 1, wherein the circuit substrate is flexible.

6. The electronic timepiece of claim 5, wherein the circuit substrate is selectively reinforced in the region of the IC chip.

7. The electronic timepiece of claim 6, wherein the circuit substrate is reinforced with copper foil about the periphery of the IC chip.

8. The electronic timepiece of claim 1, wherein the base plate is formed with a first elevated region and a second elevated region in opposed spaced relationship forming a gap therebetween;

the circuit substrate extending from the first elevated portion to the second elevated portion across the gap; and the IC chip extending into the gap in facing relationship with the base plate.

9. The electronic timepiece of claim 1, wherein the semiconductor measures at least temperature.

10. The electronic timepiece of claim 3, wherein the electronic element is a quartz crystal oscillator.

11. The electronic timepiece of claim 1, wherein the circuit supporting plate includes at least one elevated region sufficiently spacing the circuit supporting plate from the circuit substrate.

* * * * *